(12) United States Patent
Tsuk et al.

(10) Patent No.: US 9,032,390 B2
(45) Date of Patent: May 12, 2015

(54) FRAMEWORK VERSIONING

(75) Inventors: Robert Tsuk, Cupertino, CA (US); Jesse Donaldson, Santa Clara, CA (US); Matthew Kern, Bend, OR (US); Greg Simon, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1292 days.

(21) Appl. No.: 12/343,361

(22) Filed: Dec. 23, 2008

(65) Prior Publication Data

US 2010/0162229 A1  Jun. 24, 2010

(51) Int. Cl.
*G06F 9/44* (2006.01)
*G06F 9/445* (2006.01)

(52) U.S. Cl.
CPC ............. *G06F 9/44526* (2013.01); *G06F 8/61* (2013.01); *G06F 9/44536* (2013.01); *G06F 9/44552* (2013.01)

(58) Field of Classification Search
CPC ............. G06F 8/61; G06F 8/63; G06F 8/65; G06F 8/71; G06F 9/44536; G06F 9/44526; G06F 9/44552; H04L 29/08981
See application file for complete search history.

(56) References Cited

U.S. PATENT DOCUMENTS

| | | | |
|---|---|---|---|
| 6,272,674 B1 * | 8/2001 | Holiday, Jr. .................... | 717/174 |
| 6,826,750 B1 * | 11/2004 | Curtis et al. ................... | 717/170 |
| 7,350,207 B2 * | 3/2008 | Fisher ............................ | 717/178 |
| 7,380,003 B1 * | 5/2008 | Guo et al. ...................... | 709/226 |
| 7,689,985 B2 * | 3/2010 | Callender ...................... | 717/175 |
| 7,721,258 B2 * | 5/2010 | Chamberlain et al. ........ | 717/120 |
| 7,721,303 B2 * | 5/2010 | Alves de Moura et al. ... | 719/328 |
| 7,805,722 B2 * | 9/2010 | Mori et al. ..................... | 717/178 |
| 7,902,022 B2 | 3/2011 | Kang et al. | |
| 7,913,246 B2 * | 3/2011 | Hammond et al. ............ | 717/173 |
| 8,312,446 B2 * | 11/2012 | Kaminsky et al. ............. | 717/175 |
| 8,707,297 B2 * | 4/2014 | Brown et al. .................. | 717/178 |
| 2001/0013043 A1 * | 8/2001 | Wagner ......................... | 707/511 |
| 2002/0157091 A1 * | 10/2002 | DeMello et al. ............... | 717/178 |
| 2003/0018964 A1 * | 1/2003 | Fox et al. ....................... | 717/177 |
| 2003/0066066 A1 * | 4/2003 | Nguyen et al. ................ | 717/178 |
| 2004/0031024 A1 * | 2/2004 | Fairweather .................. | 717/143 |
| 2004/0034853 A1 * | 2/2004 | Gibbons et al. ............... | 717/174 |
| 2004/0168153 A1 * | 8/2004 | Marvin .......................... | 717/120 |

(Continued)

FOREIGN PATENT DOCUMENTS

WO    WO-2010075268 A2    7/2010

OTHER PUBLICATIONS

Wolfgang Andreas Klimke, Web Application Development Using Open Source and Java Technologies, 2001, p. 58-76.*

(Continued)

*Primary Examiner* — Thuy Dao
*Assistant Examiner* — Mongbao Nguyen
(74) *Attorney, Agent, or Firm* — Kilpatrick Townsend & Stockton LLP

(57) ABSTRACT

Various embodiments are directed to framework versioning for a mobile computing device. The described embodiments may include a web browser, a plurality of application frameworks, one or more applications compatible with one or more of the plurality of application frameworks, and a loader module operative to select and load one of the plurality of application frameworks into the web browser for each of the one or more applications based on an identifier in each of the one or more applications. Other embodiments are described and claimed.

15 Claims, 5 Drawing Sheets

(56) References Cited

U.S. PATENT DOCUMENTS

| | | | |
|---|---|---|---|
| 2005/0066325 A1* | 3/2005 | Mori et al. | 717/174 |
| 2005/0097082 A1* | 5/2005 | Yan | 707/3 |
| 2005/0131948 A1* | 6/2005 | Parkinson | 707/104.1 |
| 2005/0257210 A1* | 11/2005 | Stienhans et al. | 717/170 |
| 2006/0031397 A1* | 2/2006 | Sanders | 709/217 |
| 2006/0031532 A1* | 2/2006 | Sanders | 709/227 |
| 2006/0075398 A1* | 4/2006 | Bennett et al. | 717/170 |
| 2006/0200817 A1* | 9/2006 | Callender | 717/170 |
| 2006/0248140 A1* | 11/2006 | Birenheide | 709/203 |
| 2006/0248329 A1* | 11/2006 | Swanson et al. | 713/100 |
| 2007/0067418 A1* | 3/2007 | Isaacs et al. | 709/219 |
| 2007/0214453 A1* | 9/2007 | Dive-Reclus | 717/175 |
| 2007/0234352 A1* | 10/2007 | Esders et al. | 717/175 |
| 2008/0014929 A1* | 1/2008 | Padmanabhuni et al. | 455/432.1 |
| 2008/0022272 A1* | 1/2008 | Komano | 717/170 |
| 2008/0046869 A1* | 2/2008 | Lambert et al. | 717/136 |
| 2008/0046874 A1* | 2/2008 | Kostoulas et al. | 717/143 |
| 2008/0066062 A1* | 3/2008 | Zatloukal et al. | 717/143 |
| 2008/0072219 A1* | 3/2008 | Kabadiyski | 717/175 |
| 2008/0134165 A1* | 6/2008 | Anderson et al. | 717/173 |
| 2008/0163201 A1* | 7/2008 | Jogand-Coulomb et al. | 717/178 |
| 2008/0178169 A1* | 7/2008 | Grossner et al. | 717/170 |
| 2008/0201705 A1* | 8/2008 | Wookey | 717/175 |
| 2008/0301668 A1* | 12/2008 | Zachmann | 717/173 |
| 2009/0100418 A1* | 4/2009 | Raman et al. | 717/170 |
| 2009/0124198 A1* | 5/2009 | Huynh | 455/26.1 |
| 2009/0138794 A1* | 5/2009 | Becker et al. | 715/234 |
| 2009/0144718 A1* | 6/2009 | Boggs et al. | 717/170 |
| 2009/0144724 A1* | 6/2009 | Little | 717/173 |
| 2009/0172519 A1* | 7/2009 | Xu et al. | 715/234 |
| 2010/0070887 A1* | 3/2010 | Murrett et al. | 715/760 |

OTHER PUBLICATIONS

K. Abbott, The Web Application Prototype, 2002, pp. 177-182.*
Jia Zhang, Towards Increasing Web Application Productivity, 2004, pp. 1-5.*
Shawn Burke, Configuring Visual Studio to Debug .NET Framework Source Code, 2008, pp. 1-8.*
Mike Vologarsky, ASP.NET Integration with IIS 7, 2007, pp. 1-12.*
Modeling and Methodology Work Group, HL7 Development Framework Version 1.4 Release 1, 2009, pp. 63-70.*

* cited by examiner

FRAMEWORK VERSIONING

CROSS REFERENCE TO RELATED APPLICATIONS

This application is related to the copending application by Chatterjee et al., entitled "Application Management Framework for Web Applications," Ser. No. 12/181,776 filed on Jul. 29, 2008 which application is hereby incorporated by reference in its entirety.

BACKGROUND

Web browsers have become highly capable software packages in recent years. In addition to rendering web pages, a web browser may implement a variety of web applications. Such web applications may be implemented using various web technologies such as HTML, XHTML, XML, and Asynchronous JavaScript and XML (Ajax), for example. Some applications may run in a web browser on a mobile device, such as a cellular telephone or smartphone. Utilizing web applications as a platform for developing and distributing applications for mobile devices has several advantages, including simplified application development, decreased application size, increased application responsiveness and increased numbers of qualified application developers leading to a more robust selection of applications.

Although a web application has many advantages, it suffers in a number of areas. For instance, web applications are typically designed to run on a specific application framework. Application frameworks, however, are often updated and revised to improve the user experience. Absent an update from the application developer in response to the updated application framework, the web application may not render properly or even function properly following an application framework update. This places an undue burden on developers to continually update their applications and inconveniences users who expect their applications to function properly. Consequently, there exists a substantial need for improvements to application framework versioning.

DETAILED DESCRIPTION

Figure 1:
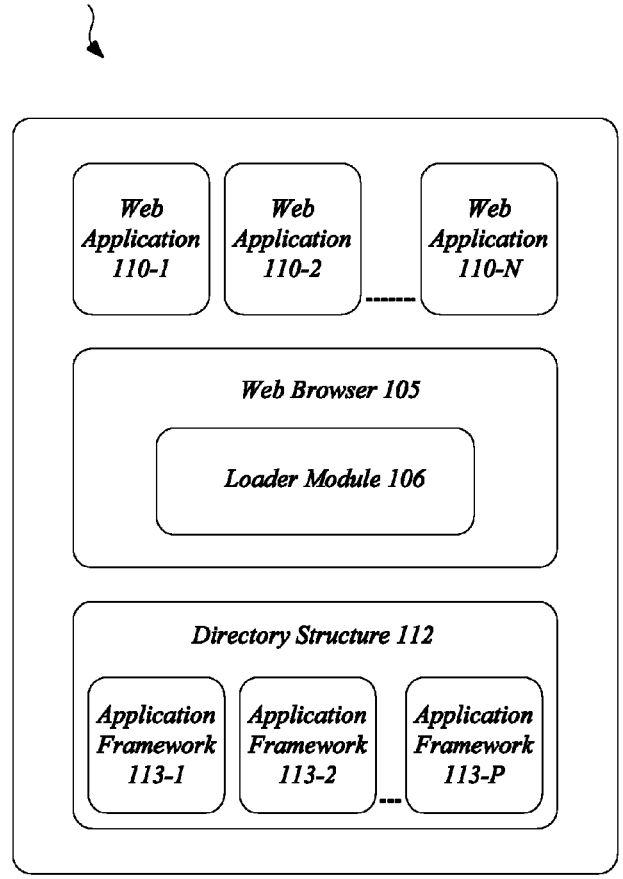
FIG. 1 illustrates an embodiment of a mobile computing device.

Various embodiments are directed to a mobile computing device comprising a web browser and a plurality of application frameworks. The mobile computing device may include one or more applications compatible with one or more of the plurality of application frameworks. A loader module may also be included in various embodiments. The loader module may be operative to select and load one of the application frameworks into the web browser for each of the one or more applications based on an identifier in each of the one or more applications. Other embodiments are described and claimed.

An application framework generally refers to a software framework that is used to implement a standard structure for an application in a specific operating environment. The use of application frameworks allows developers to rely on a standard structure when developing their applications resulting in a consistent look and feel for the end user. The use of application frameworks in developing applications may also allow for additional capabilities provided by the framework to be utilized in the applications, such as caching of content or data for offline access, providing for updates to the contained applications, accessing native services of the mobile device such as calendar or contact data, and insertion of advertising into the application user interfaces, for example.

Application developers typically design their applications with a specific application framework in mind. When the application framework changes or is updated, however, certain functionality of the application may not longer operate as intended. This requires application developers to either update their applications to coincide with the updated application framework, or to continue with a less than ideal operating environment for their application. It is desirable, therefore, to allow application developers to specify an application framework for their applications and to continue to support a plurality of application frameworks on a mobile computing device. It should be understood that reference to a plurality of application frameworks throughout the application may refer to one application framework in some embodiments.

Numerous specific details are set forth to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

FIG. 1 illustrates a mobile computing device 102 suitable for implementing various embodiments. As shown, mobile computing device 102 may comprise web applications 110-1 through 110-N, web browser 105, loader module 106 directory structure 112 and application frameworks 113-1 through 113-P. Although FIG. 1 may show a limited number of components by way of example, it can be appreciated that a greater or a fewer number of components may be employed for a given implementation.

In various embodiments, the mobile computing device 102 may include various physical and/or logical components for communicating information which may be implemented as hardware components (e.g., computing devices, processors, logic devices), executable computer program instructions (e.g., firmware, software) to be executed by various hardware components, or any combination thereof, as desired for a given set of design parameters or performance constraints. Exemplary mobile computing devices may include a personal computer (PC), desktop PC, notebook PC, laptop computer, mobile computing device, smart phone, personal digital assistant (PDA), mobile telephone, combination mobile telephone/PDA, video device, television (TV) device, digital TV (DTV) device, high-definition TV (HDTV) device, media player device, gaming device, messaging device, or any other suitable communications device in accordance with the described embodiments.

The mobile computing device 102 may form part of a wired communications system, a wireless communications system, or a combination of both. For example, the mobile computing device 102 may be arranged to communicate information over one or more types of wired communication links such as a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The mobile computing device 102 may be arranged to communicate information over one or more types of wireless communication links such as a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. In wireless implementations, the mobile computing device 102 may comprise one more interfaces and/or components for wireless communication such as one or more transmitters, receivers, transceivers, amplifiers, filters, control logic, wireless network interface cards (WNICs), antennas, and so forth. Although certain embodiments may be illustrated using a particular communications media by way of example, it may be appreciated that the principles and techniques discussed herein may be implemented using various communication media and accompanying technology.

As shown in FIG. 1, the mobile computing device 102 may include a web browser 105. The web browser 105 may be implemented by a desktop and/or mobile version of a web browser such as Internet Explorer®, Mozilla®, Firefox®, Safari®, Opera®, Netscape Navigator®, and/or any other suitable web browser in accordance with the described embodiments. In various embodiments, the web browser 105 may support the computer programming languages, standards, web protocols, and/or technologies required by web applications 110-1 through 110-N and application frameworks 113-1 through 113-P. Such computer programming languages, standards, web protocols, and/or technologies may include, but are not limited to, HTML, XHTML, XML, Flash®/ActionScript, Macromedia® Flash®, JavaScript, ECMAScript, JScript, Basic, Visual Basic®, Visual Basic® Scripting Edition (VBScript), CSS, Asynchronous JavaScript and XML (Ajax), Flex®, Java®, Python, Perl®, C#/.net, Flash®, and/or other suitable programming, scripting, or VM-based languages.

In various implementations, the web browser 105 may provide the basis of the user interface and may include a language interpreter such as a script interpreter for computer programming languages such as JavaScript®, Flash®, VBScript, and/or other scripted programming languages where browser-based scripts, bytecode sets, or languages are interpreted in real time by runtime interpreter. The web browser 105 may provide a platform for running web applications 110-1 through 110-N in the web browser 105 using various web technologies such as HTML, XHTML, XML, Asynchronous JavaScript and XML (Ajax), and so forth.

As shown, mobile computing device 102 may comprise and encapsulate one or more web applications such as web applications 110-1 through 110-N, where N is any suitable positive integer value in accordance with the described embodiments. The web applications 110-1 through 110-N each may be written in any language supported by the web browser 105. Examples of web applications may include weather applications, finance applications, communication applications, game applications, entertainment applications, multimedia applications, utility applications, social networking applications, music applications, productivity applications, reference applications, search applications, sports applications, navigation applications, news applications or any other type or form of application suitable for execution within web browser 105.

Figure 2A:
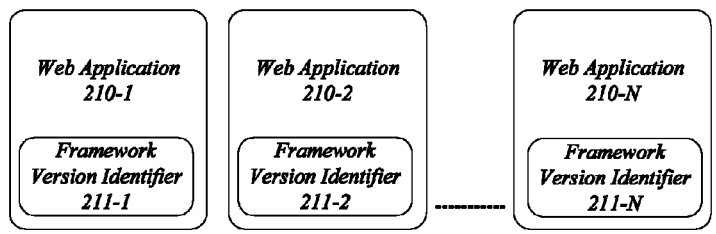
FIG. 2A illustrates an embodiment of web applications.

As shown in FIG. 2A, each web application 210-1 through 210-N (e.g. 110-1 through 110-N) may include a distinct identifier comprising an application framework version identifier 211-1 through 211-N. In various embodiments, the application framework version identifier may comprise a tag to identify an application framework version that is compatible with the web application. For example, the tag may include a JavaScript tag, universal resource locator (URL), HTML tag or any other suitable tag capable of identifying a compatible framework version. In some embodiments, the tag may comprise a script tag such as "<script src="luna.js?version=1/>" where the language following the "?" identifies the version of the application framework that is compatible with the web application, for example. Other embodiments are described and claimed.

In various embodiments, mobile computing device 102 may include one or more applications frameworks 113-1 through 113-P. The plurality of application frameworks 113-1 through 113-P may comprise different application framework versions in some embodiments. For example, application framework 113-1 may comprise version 1 (V1) of an application framework, application framework 113-2 may comprise version 2 (V2) of an application framework, and application framework 113-P may comprise version P (VP) of an application framework. Any number of application framework versions may be used and still fall within the described embodiments.

One or more application frameworks 113-1 through 113-P may be stored on mobile computing device 102 at any time in various embodiments. Furthermore, in some embodiments older versions of application frameworks may be deleted from mobile computing device 102 when they become obsolete or are no longer being utilized. For example, version 1 (e.g. application framework 113-1) may be deleted from mobile computing device 102 after a certain period of time has passed, after a certain number of new application frameworks 113-2 through 113-P have been added, after a software update indicating that version 1 of the application framework is no longer needed, or for any other suitable reason.

In some embodiments, each application framework version 113-1 through 113-P may be periodically updated without being replaced. For example, a new submission, release or build of an application framework version may be loaded onto mobile computing device 102 to make minor changes, fix bugs or problems with a previous release or for any other suitable reason. It should be understood that if this type of version updating occurs, the newest submission, release or build of a requested application framework version will be configured and loaded when the particular framework version is requested.

In some embodiments, the web applications 110-1 through 110-N may comprise or be implemented within one or more of the application frameworks 113-1 through 113-P. The application frameworks 113-1 through 113-P may comprise any software framework that is used to implement a standard structure for an application in a specific operating system or, for example, in web browser 105. In various embodiments, mobile computing device 102 may store and make available all or some application frameworks 113-1 through 113-P, allowing any of applications 110-1 through 110-N to access any of the stored application frameworks as needed.

In general, the application frameworks 113-1 through 113-P may be written in any computer programming language supported by web browser 105 such as in one or more programming, scripting, or Virtual Machine (VM) based languages. For example, various standard web technologies such as HTML, CSS, JavaScript, ECMAScript may be applied to create the application frameworks 113-1 through 113-P. Since many web page authors are familiar with these technologies, the benefits of using the application frameworks will be readily apparent. It can be appreciated that development using web technologies is generally much faster and easier than is the case for specialized native programming languages such as C, C++, and so forth. Further, such native programming languages often require expensive development tools for mobile devices. For web applications, however, a wide array of freely available or inexpensive software development tools makes web application development possible for a much larger community of developers.

The application frameworks 113-1 through 113-P may control certain aspects of the one or more web applications 110-1 through 110-N. For example, the application frameworks 113-1 through 113-P may control which web application is visible to the user at a given time, whether a web application is actively processing data, and/or when to direct a web application to be "refreshed" or reloaded into the web browser 105. The application frameworks 113-1 through 113-P also may prompt one or more of the contained web applications 110-1 through 110-N to reload or update its data.

In various implementations, the application frameworks 113-1 through 113-P may provide a mechanism for developers to incorporate multitasking into one or more of the web applications 110-1 through 110-N. For example, by programmatically "hiding" a web application using a hidden frame, the application frameworks 113-1 through 113-P may allow a web application to run in the background while the user sees the user interface of a different web application.

The application frameworks 113-1 through 113-P also may provide a mechanism by which developers may incorporate web-based advertising into their web applications. For example, the web applications 110-1 through 110-N may use existing advertising links and scripting methods, yet be viewable on a wide range of devices, including computers and mobile phones. One or more of the web applications 110-1 through 110-N may include banner advertisement and/or may themselves be advertisements controlled and configured by the application frameworks 113-1 through 113-P. It can be appreciated that the application frameworks 113-1 through 113-P make possible a business method of providing free or low-cost web applications to end users where advertising revenue may be shared among web application developers, device makers, service providers, and even end users.

The application frameworks 113-1 through 113-P may be stored in a directory structure 112 in various embodiments. Directory structure 112 may comprise any suitable storage medium or filing system on mobile computing device 102. For example, in some embodiments, the plurality of application framework versions 113-1 through 113-P may each be stored in a separate folder. As shown in more detail in FIG. 2B, directory structure 112, 212 may also include a shared folder 214. Shared folder 214 may include any elements or files that are common to more than one of the application framework versions 113-1 through 113-P. Including common elements or files in shared folder 214 may decrease redundancy and improve efficiency of the system when an application framework is selected and loaded into web browser 105. Other embodiments are described and claimed.

In some embodiments, the web browser 105 may include a loader module 106. Loader module 106 may include any program capable of loading program or application files, preparing them for execution and executing the files. While the loader module 106 is shown as part of web browser 105 in FIG. 1 by way of example, it should be understood that loader module 106 could be implemented separately from web browser 105 and still fall within the described embodiments. Loader module 106 may be operative to select and load one of the plurality of application frameworks 113-1 through 113-P from directory structure 112 into the web browser 105 for each of the one or more applications 110-1 through 110-N. The loading module 106 may load the appropriate application framework 113-1 through 113-P based on an identifier in each of the one or more applications 110-1 through 110-N. In various embodiments, the loader module 106 may be configured to parse the one or more applications 110-1 through 110-N to identify an identification tag and select and load the compatible application framework version 113-1 through 113-P based on the isolated tag.

In various embodiments, each of the one or more applications 110-1 through 110-N may be compatible with one or more of the application frameworks 113-1 through 113-P. For example, an application that is developed for a particular version of the application framework and includes a tag indicating that it is intended to be implemented using the particular version, may be completely compatible with the identified framework version as long as the version remains available. It should be understood that the application in the above example may also be compatible with other versions of the application framework. Some functionality of the application may, however, be rendered inoperative if the application is loaded into an unintended framework version that has different features than the intended framework version. In some embodiments, when an identified application framework version is not available, a different application framework version may be selected and used. Other embodiments are described and claimed.

The above described embodiments may be better understood by way of the following example which is not intended to limit the scope of the described embodiments. A mobile computing device, such as a smartphone, may be released with first version (V1) of an application framework and applications may be developed that are compatible with V1 of the application framework. For example, applications A1, A2 and A3 may be developed, each of which are designed for use with V1 of the application framework. These applications can be loaded onto the mobile computing device and implemented using V1 of the application framework based on a tag in each of the applications indicating that V1 is the intended application framework version.

A second version (V2) of the application framework may subsequently be developed and loaded onto the mobile computing device. The mobile computing device will now include both V1 and V2 of the application framework and each of applications A1, A2 and A3 will continue to function as intended using V1 of the application framework. If the developer of application A2, for example, updates application A2 to support V2 of the application framework, the developer can simply update a tag in the application indicating that the application should load using V2 of the application framework and the result will be that application A2 will now load using framework version V2.

At this point, applications A1 and A3 include tags indicating that they are to be loaded using V1 of the application framework and application A2 includes a tag indicating that it is to be loaded using V2 of the application framework. Subsequently, version three (V3) of the application framework may be released and loaded onto the mobile computing device. Thereafter, the developer of application A1 may update her application to support V3 of the application framework and may update the framework identification tag to indicate that application A1 should be loaded using V3 of the application framework. The mobile computing device now contains three different applications and three different, supported application framework versions, for example. It should be understood that any number of applications and any number of application framework versions may be supported on the mobile computing device and still fall within the described embodiments. Other embodiments are described and claimed.

Figure 3:
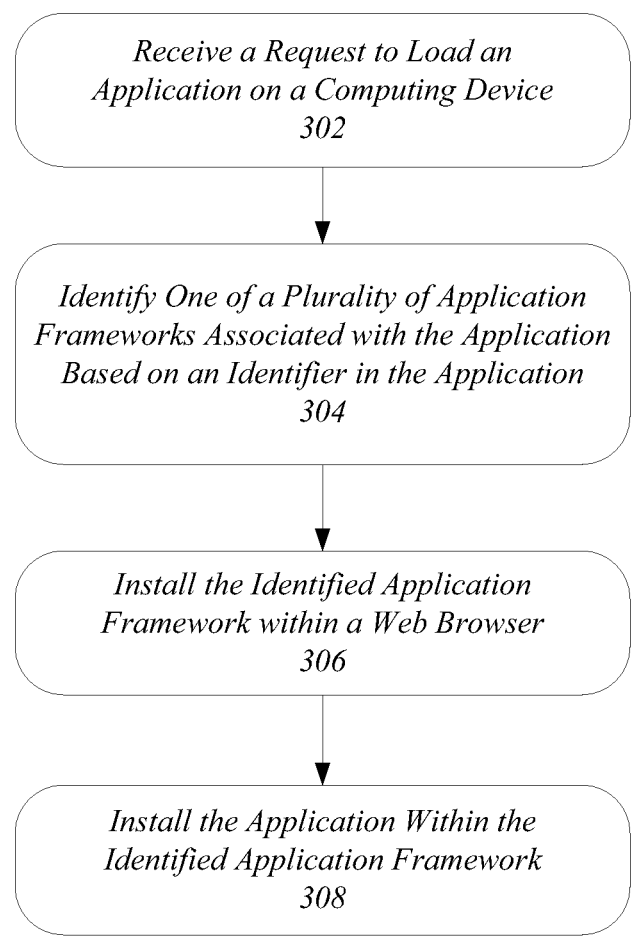
FIG. 3 illustrates an embodiment of a logic flow.

FIG. 3 illustrates one embodiment of a logic flow 300. The logic flow 300 may be performed by various systems and/or devices and may be implemented as hardware, software, firmware, and/or any combination thereof, as desired for a given set of design parameters or performance constraints. For example, one or more operations of the logic flow 300 may be implemented by executable programming instructions to be executed by a logic device (e.g., computer, processor).

In one embodiment, a request to load an application on a computing device is received at 302. For example, a user may select or activate an application on mobile computing device 102. In various embodiments, a user may select an icon representing the application on a touch screen of the mobile computing device 102 to activate the application. The application may comprise a web application, such as applications 110-1 through 110-N of FIG. 1, for implementation within a web browser such as web browser 105, for example.

At step 304, one of a plurality of application frameworks that is associated with the requested application is identified based on an identifier in the application. For example, each application may contain an identifier or tag that associates the application with an intended application framework version. The identifier may comprise an application framework version identifier in various embodiments. The identifier or tag may be parsed from the code of the application and the appropriate application framework version may be identified and selected based on the parsed application framework version identifier. In various embodiments, an attribute of the tag may be parsed or separate attributes of the tag may be used to identify the associated application framework. Other embodiments are described and claimed.

The identified application framework is installed within a web browser at 306. For example, any of application frameworks 113-1 through 113-P, if selected, may be installed within web browser 105. At 308, the requested application is installed within the identified application framework. For example, following the installation of one of the applications frameworks 113-1 through 113-P within web browser 105, any of applications 110-1 through 110-N may be installed within the identified application framework. In various embodiments, the applications 110-1 through 110-N may be installed on the computing device 102 or in a memory on the computing device to be used in combination with the identified application framework as needed, rather than being installed within one of the application frameworks 113-1 through 113-P.

Figure 2B:
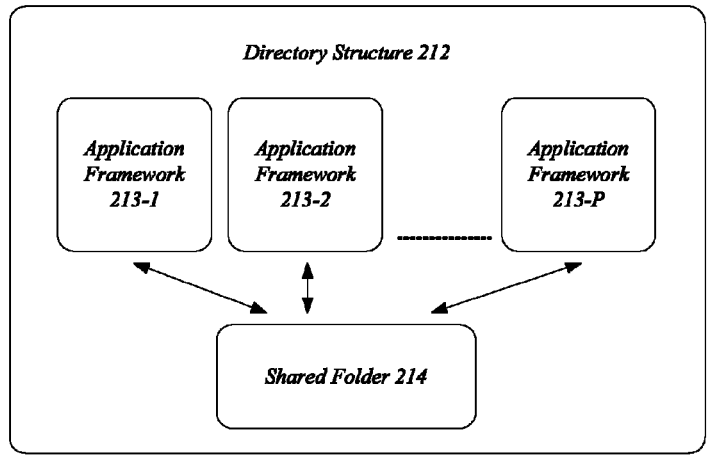
FIG. 2B illustrates an embodiment of a directory structure.

In some embodiments, the identified application framework may be loaded from a directory structure. The directory structure may comprise separate folders for each application framework version and a shared folder comprising elements common to a plurality of application framework versions. For example, as shown in FIG. 2B, directory structure 212 may comprise application frameworks 213-1 through 213-P and shared folder 214. Each of the application frameworks 213-1 through 213-P may utilize common elements contained within shared folder 214. Other embodiments are described and claimed.

In various embodiments, multiple web applications and application frameworks may be loaded within web browser 105. For example, web application assets for a first web application may be loaded within a first application framework and, if there are additional web applications available, the process may be repeated for each web application and each application framework. In some embodiments, multiple applications may be running within different applications frameworks in different browser instances, resulting in simultaneous access to all or part of the available application and framework resources of the mobile computing device.

It can be appreciated that the logic flow 300 depicts an exemplary sequence for initializing web applications and application frameworks and that alternative steps may be used to install one or more web applications in the application frameworks and the application frameworks within the web browser. For example, in some cases, web applications may be inserted directly in the source code for the application frameworks. Additionally or alternatively, one or more web publications may be stored to be loaded by the application frameworks at startup or upon request by the user.

In various embodiments, a list of web applications may be stored in "cookies" on the computing device of the user so that the web applications can be reloaded or configured. In some cases, the list of web applications may be served via server-side logic (e.g., SOAP, REST, JSON, etc.). Some embodiments may use server-side languages (e.g., PHP) to permit building of a web application launcher that may be customized by the user and/or by the web application developer. Certain embodiments also may allow saving of user preferences, configurations, or web application data into a database implemented locally on the device of the user or on a network server. In addition, the application frameworks may be compatible with "plug-in" technologies such as Adobe PDF, Flash®, VMRL, and others.

Figure 4:
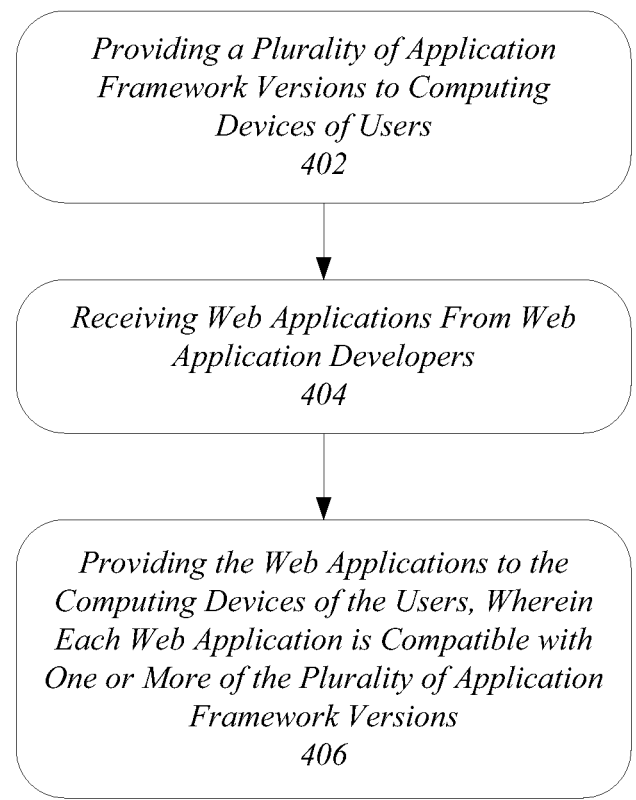
FIG. 4 illustrates an embodiment of a logic flow.

FIG. 4 illustrates one embodiment of a logic flow 400. The logic flow 400 may be performed by various systems and/or devices and may be implemented as hardware, software, firmware, and/or any combination thereof, as desired for a given set of design parameters or performance constraints. For example, one or more operations of the logic flow 400 may be implemented by executable programming instructions to be executed by a logic device (e.g., computer, processor).

At 402, a plurality of application framework versions may be provided to computing devices of users. For example, different application framework versions may be provided to computing devices of users via software updates, hardware updates, firmware updates, forced downloads or any other suitable form of supplying framework versions. Additionally, the different framework versions may be provided to the devices of users automatically or user intervention may be required to allow framework versions to be provided to the computing devices. The different application framework versions may be necessary based on framework updates, changes to framework features, bug fixes, addition of features, deletion of features or any other suitable reason for including an additional version of an application framework.

In various embodiments, the plurality of application framework versions are stored in a directory structure on the computing devices. For example, directory structure 212 of FIG. 2B may be stored on mobile computing device 102. The directory structure may comprise separate folders for each application framework version in some embodiments. Additionally, the directory structure may also include a shared folder comprising elements common to a plurality of application framework versions. Other embodiments are described and claimed.

Web applications may be received from web application developers at 404. Any number of web applications may be received and distributed to mobile computing devices. Additionally, the web applications may be written in any language supported by a web browser on the mobile computing device. In various embodiments, each web application is compatible with one or more of the plurality of application framework versions. In some embodiments, each web application includes an application framework version tag to identify a compatible application framework version.

At 406, the web applications may be provided to the computing devices of users. Similar to the application framework version distribution, the web applications may be provided to computing devices of users via software updates, hardware updates, firmware updates, forced downloads or any other suitable form of supplying web applications. Additionally, the web applications may be provided to the devices of users automatically or user intervention may be required to allow web applications to be provided to the computing devices.

In various embodiments, the web applications and the application framework versions are available regardless of an online or offline network status of the computing devices. For example, a mobile computing device 102 may lose its network connection from time to time. During these intervals, it would be advantages for users to still have access to their web applications. In some embodiments, therefore, the web applications 110-1 through 110-N and the application frameworks 113-1 through 113-P are stored locally on the mobile computing device. In this manner, the applications and the application frameworks will still function with or without an active network connection. It should be understood, however, that certain functionality of some applications may not be available when the mobile computing device is not connected to a network. Other embodiments are described and claimed.

The distribution of web applications and application frameworks may occur from a central server in some embodiments. For example, the party responsible for receiving web applications from developers and for distributing the applications and the application frameworks may host a web server or other suitable server, and may allow access to the information stored on the server. In some embodiments, users of mobile computing devices may log into the central server to download applications and application frameworks. In some embodiments, the central server may include a web interface front end, such as a website. In other embodiments, the web applications may be distributed through an application store.

In some embodiments, users may download or receive applications and application frameworks on a laptop or desktop personal computer, and transfer the appropriate information to their mobile computing device. In various embodiments, applications and application frameworks may be downloaded or received directly onto a mobile computing device. Other embodiments are described and claimed.

Figure 5:
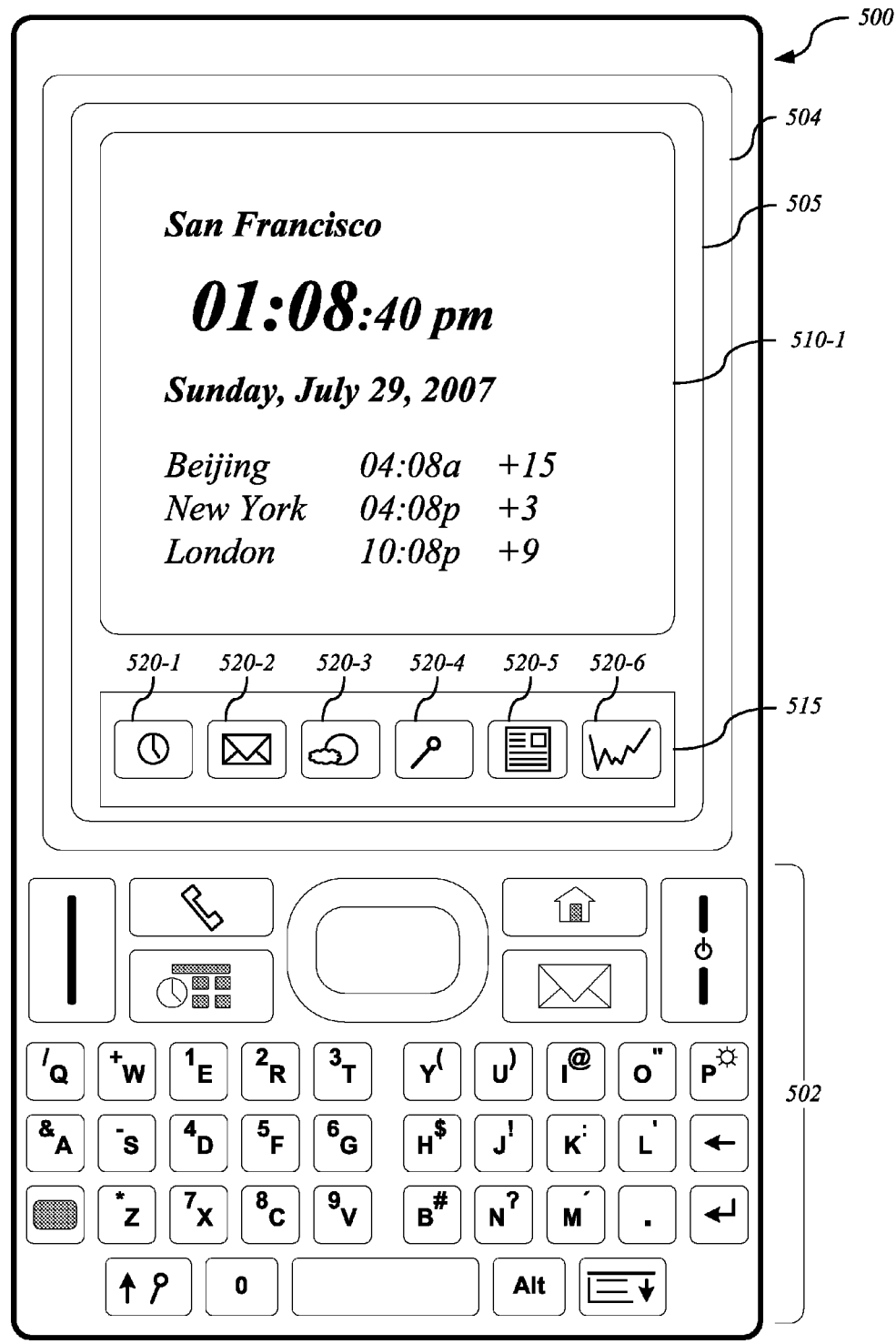
FIG. 5 illustrates an embodiment of a mobile device including web application and application management framework user interfaces.

FIG. 5 illustrates a mobile device 500 suitable for implementing various embodiments. In various embodiments, mobile device 500 may represent mobile computing device 102 of FIG. 1, for example. As shown, the mobile device 500 may be implemented as a combination handheld computer and mobile telephone, sometimes referred to as a smart phone. It can be appreciated that the mobile device 500 may comprise a computing device having a handheld form factor. While certain embodiments may be described with the mobile device 500 implemented as a smart phone by way of example, the mobile device 500 may be implemented as other types of user equipment (UE) or wireless computing devices such as a mobile telephone, personal digital assistant (PDA), combination mobile telephone/PDA, handheld device, mobile unit, subscriber station, game device, messaging device, media player, pager, or other suitable mobile communications devices.

The mobile device 500 generally may be configured to support or provide cellular voice communication, wireless data communication, and computing capabilities in accordance with the described embodiments. The mobile device 500 may comprise various components for providing such capabilities including, for example, a printed circuit board (PCB), one or more processors (e.g., host processor, radio processor), one or more transceivers (e.g., voice communications transceiver, data communications transceiver, GPS transceiver), memory (e.g., volatile or non-volatile memory, removable or non-removable memory, erasable or non-erasable memory, writeable or re-writeable memory), internal and/or external antennas, a rechargeable battery, and others.

The mobile device 500 may provide voice and wireless data communications functionality by communicating with a mobile network such as a Code Division Multiple Access (CDMA) network, Global System for Mobile Communications (GSM) network, North American Digital Cellular (NADC) network, Time Division Multiple Access (TDMA) network, Extended-TDMA (E-TDMA) network, Narrowband Advanced Mobile Phone Service (NAMPS) network, third generation (3G) network such as a Wide-band CDMA (WCDMA) network, CDMA-2000 network, Universal Mobile Telephone System (UMTS) network, and others.

The mobile device 500 also may support wireless wide area network (WWAN) data communications services including Internet access. Examples of WWAN data communications services may include Evolution-Data Optimized or Evolution-Data only (EV-DO), Evolution For Data and Voice (EV-DV), CDMA/1xRTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others.

The mobile device 500 may provide wireless local area network (WLAN) data communications functionality in accordance with the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and others.

The mobile device 500 also may be arranged to perform data communications functionality in accordance with shorter range wireless networks, such as a wireless personal area network (PAN) offering Bluetooth® data communications services in accordance with the Bluetooth® Special Interest Group (SIG) series of protocols, specifications, profiles, and so forth. Other examples of shorter range wireless networks may employ infrared (IR) techniques or near-field communication techniques and protocols, such as electromagnetic induction (EMI) techniques including passive or active radio-frequency identification (RFID) protocols and devices.

The mobile device 500 may comprise various input/output (I/O) interfaces for establishing connections to other devices. The I/O interfaces may comprise, for example, a serial connection port, an IR port, a Bluetooth® interface, a network interface, a WiFi interface, a WiMax interface, a cellular network interface, a wireless network interface card (WNIC), a transceiver, and so forth. Such connections may be implemented using various wired and/or wireless communication media in accordance with the described embodiments. Although certain exemplary embodiments may be described as using a particular communication media by way of example, it may be appreciated that the principles and techniques discussed herein may be implemented using various communication media and accompanying technology.

In some implementations, a connection may comprise a wired connection such as a Universal Serial Bus (USB) connection (e.g., USB host, USB net), Serial Bus Interface (SBI) connection (e.g., FireWire®), or other suitable wired connection to directly connect (e.g., tether, plug in) the mobile device 500 to a device when in close proximity. In other implementations, a connection may comprise a short range wireless connection (e.g., Bluetooth® connection, IR connection) to communicatively couple the mobile device 500 to a device when in close proximity. In some implementations, the a connection may comprise a network connection between the mobile device 500 and a device such as a WiFi connection, WiMax connection, Ethernet connection, cellular network (e.g., 1G/2G/3G) connection, or other suitable packet data or switched connection in accordance with the described embodiments.

The mobile device 500 may comprise various software programs such as system programs and applications to provide computing capabilities in accordance with the described embodiments. Exemplary system programs may include, without limitation, an operating system (OS), device drivers, programming tools, utility programs, software libraries, application programming interfaces (APIs), and so forth. Exemplary operating systems may include, for example, a Palm OS®, Microsoft® OS, Unix® OS, Linux® OS, Symbian OS™, Embedix OS, Binary Run-time Environment for Wireless (BREW) OS, JavaOS, a Wireless Application Protocol (WAP) OS, and others.

The mobile device 500 may provide a variety of applications for allowing a user to accomplish one or more specific tasks. Exemplary applications may include, without limitation, a web browser application (e.g., web browser 105), telephone application (e.g., cellular, VoIP, PTT), networking application, messaging application (e.g., e-mail, IM, SMS, MMS), contacts application, calendar application, word processing application, spreadsheet application, database application, media application (e.g., video player, audio player, multimedia player, digital camera, video camera, media management), location based services (LBS) application, gaming application, and so forth. The applications may comprise or be implemented as executable computer program instructions stored on computer-readable storage media such as volatile or non-volatile memory capable of being retrieved and executed by a processor to provide operations for the mobile device 500. The memory also may implement various databases and/or other types of data structures (e.g., arrays, files, tables, directory structure, records) for storing data for use by the processor and/or other elements of the mobile device 500.

The mobile device 500 may comprise various components or devices for interacting with an application such as keypad 502 for inputting data and/or commands and a display 504 (e.g., touch-sensitive screen) for presenting one or more user interfaces and receiving user input. It can be appreciated that the mobile device 500 may comprise a variety of components or devices for use with one or more applications such as a stylus, keys (e.g., input keys, preset and programmable hot keys), buttons (e.g., action buttons, a multidirectional navigation button, preset and programmable shortcut buttons), switches, a microphone, speakers, an audio headset, a camera, and so forth.

In accordance with various embodiments, the mobile device 500 may comprise application frameworks 113-1 through 113-P implemented by a web browser 105 and including multiple web applications 110-1 through 110-N, as described above.

As shown, the mobile device 500 may present a web browser UI 505 as an instance of the web browser 105. The web browser UI 505 may display a web application UI 510-1 corresponding to the web application 110-1. In this embodiment, the web application 110-1 may comprise an active clock application, and the web application UI 510-1 may display the local date and time for the mobile device 500 as well as the time in other locations. The web browser UI 505 also displays an application management framework UI 515 providing an interface for rapidly switching between the web applications 110-1 through 110-N and receiving a common set of input controls. In various implementations, the web browser 105 may comprise built-in widget controls implemented by the mobile device 500.

In one or more embodiments, the application management framework UI 515 may be implemented as a menu bar comprising a set of icons 520-1 through 520-M, where M is any suitable positive integer value in accordance with the described embodiments. The menu bar of the application management framework UI 515 may be implemented as an application flip tray comprising a page flipping UI such that the user can flip through web applications or widgets very fast in response to a single user event such as single screen touch (e.g., pressing or sliding), button press (e.g., navigation button, a dedicated hard key, a soft key), or interaction with auxiliary controls such as a jog-dial wheel. The user also may select or advance to a particular web application by using any combination of touchscreen events (e.g., touching or pressing on an icon), button events (e.g., mobile device 500 may have dedicated hard or soft key buttons for select, next, and previous), jog-dial events, and screen events (e.g., clicking an icon via a mouse or other random navigation events. In some implementations, the icon tray may auto-hide itself to reserve available screen area. In such cases, the icon tray may only appear momentarily when the user is switching between web applications using the aforementioned events.

As depicted in this exemplary embodiment, the set of icons 520-1 through 520-M includes icons 520-1 through 520-6 for switching between and among active web applications. As shown, the icons 520-1 through 520-6 may be implemented as a clock icon 520-1, a web mail icon 520-2, a weather icon 520-3, a search icon 520-4, a news reader icon 520-5, and a stock listing icon 520-6. The icons 520-1 through 520-6 may correspond, for example, to web applications such as web applications 110-1 through 110-N. It can be appreciated, however, that the arrangement and order of the icons 520-1 through 520-6 does not necessarily have to correspond to the order of the web applications 110-1 through 110-N. In some embodiments, for example, the user may set preferences, drag and drop, move, add, remove, and/or otherwise customize the set of icons displayed by the application management framework UI 515.

It also can be appreciated the positions and shapes of the components of the application management framework UI 515 are not limited to the embodiment shown in FIG. 5. The attributes of the application management framework UI 515 may be easily changed by modifying graphics elements or layout parameters of the underlying web page and are readily customizable by the web page author. For example, while the application management framework UI 515 is shown as a horizontal bar at the bottom of the web browser UI 505, it also may be placed in a vertical bar along the left side of the web browser UI 505. The application management framework UI 515 also may be hidden at times. As another example, any number of web application icons may be used, each corresponding to web application, as is practical.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. It also can be appreciated that while a logic flow may illustrate a certain sequence of steps, other sequences of steps may also be performed according to alternative embodiments. Moreover, some individual steps of a logic flow may include multiple sub-steps that may be performed in various sequences as appropriate to the individual step. Furthermore, additional steps may be added or some steps may be removed depending on the particular implementation.

In addition, the logic flow may be implemented by a hardware element, a software element executed by a computer, a firmware element embedded in hardware, or any combination thereof. In various embodiments, the logic flow may comprise, or be implemented as, executable computer program instructions. The executable computer program instructions may be implemented by software, firmware, a module, an application, a program, a widget, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The executable computer program instructions may be implemented using any suitable high-level, low-level, object-oriented, visual, compiled and/or interpreted programming language in accordance with the described embodiments.

In various embodiments, a logic flow may comprise, or be implemented as, executable computer program instructions stored in an article of manufacture and/or computer-readable storage medium. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments. In such embodiments, a computer may include any suitable computer platform, device, system, or the like implemented using any suitable combination of hardware and/or software.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable storage media in accordance with the described embodiments.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A method, comprising:
receiving a request to load an application on a computing device;
parsing the application to determine an identifier;
identifying one of a plurality of application frameworks associated with the application based on the identifier in the application, the application compatible for execution on the computing device within the identified application framework, the identified application framework provides a standard structure for the application to operate within a web browser and controls one or more aspects of the application;
installing the identified application framework within the web browser;
installing the application within the identified application framework on the computing device to be used in combination with the identified application framework, wherein the identifier in the application comprises an application framework version identifier comprising a tag to identify an application framework version that is compatible with the application, and wherein parsing the application further comprises parsing the application to identify the tag and select and load the compatible application framework version.

2. The method of claim 1, wherein the plurality of application frameworks comprise different application framework versions.

3. The method of claim 2, further comprising:
loading the application framework from a directory structure, the directory structure comprising separate folders for each application framework version and a shared folder comprising elements common to a plurality of application framework versions.

4. The method of claim 1, wherein the one or more applications comprise web applications supported by the web browser.

5. A method comprising:
  providing a plurality of application framework versions to computing devices of users;
  receiving web applications from web application developers;
  parsing the web applications to determine an identifier;
  identifying the one of a plurality of the application framework versions compatible for execution of the web applications, the one of the plurality of the application framework versions are identified from the identifier in the web applications, the one of a plurality of the application framework versions provides a standard structure for the web applications to operate within a web browser and controls one or more aspects of the web applications, wherein the identifier in the web applications comprises an application framework version identifier comprising a tag to identify an application framework version that is compatible with the web applications, wherein parsing the web applications further comprises parsing the web applications to identify the tag and select and load the compatible application framework version; and
  providing the web applications to the computing devices of the users.

6. The method of claim 5, wherein the plurality of application framework versions are stored in a directory structure on the computing devices of the users, the directory structure comprising separate folders for each application framework version and a shared folder comprising elements common to a plurality of application framework versions.

7. The method of claim 5, wherein the computing devices of the users comprise the web browser to support the web applications.

8. The method of claim 5, wherein the web applications are available regardless of an online or offline network status of the computing devices of the users.

9. An article of manufacture comprising a non-transitory machine-readable storage medium containing instructions that when executed by a processor enable a system to:
  receive a request to load an application;
  parse the application to determine an identifier;
  identify one of a plurality of application frameworks associated with the application based on an identifier in the application, the application compatible for execution within the identified application framework, the identified application framework provides a standard structure for the application to operate within a web browser and controls one or more aspects of the application, wherein the identifier the application comprises an application framework version identifier comprising a tag to identify an application framework version that is compatible with the application, wherein parsing the application further comprises parsing the application to identify the tag and select and load the compatible application framework version;
  install the identified application framework compatible with the application within the web browser based at least in part on the identified tag; and
  install the application within the installed application framework or in a memory to be used in combination with the installed application framework.

10. The article of manufacture of claim 9, wherein the plurality of application frameworks comprise different application framework versions.

11. The article of manufacture of claim 9, further comprising instructions that when executed by the processor enable the system to:
  load the application framework from a directory structure, the directory structure comprising separate folders for each application framework version and a shared folder comprising elements common to a plurality of application framework versions.

12. A mobile computing device, comprising:
  a processor;
  a web browser implemented by the mobile computing device;
  a plurality of application frameworks for installation into the web browser, wherein each of the plurality of application frameworks provides a standard structure for web applications to operate within the web browser and controls one or more aspects of the web applications;
  one or more web applications compatible for execution on the mobile computing device within one or more of the plurality of application frameworks; and
  a loader module operative to select a compatible application framework and load the compatible application framework into the web browser on the mobile computing device for each of the one or more web applications based on an identifier in each of the one or more applications, the loader module to parse each of the one or more applications to determine the identifier, wherein the identifier in the one or more web applications comprises an application framework version identifier comprising a tag to identify an application framework version that is compatible with the one or more web applications, wherein parsing each of the one or more web applications further comprises parsing the one or more web applications to identify the tag and select and load the compatible application framework version.

13. The mobile computing device of claim 12, wherein the plurality of application frameworks comprise different application framework versions.

14. The mobile computing device of claim 13, further comprising:
  a directory structure to organize the plurality of application framework versions, the directory structure comprising separate folders for each application framework version and a shared folder comprising elements common to a plurality of application framework versions.

15. The mobile computing device of claim 12, wherein the loader module is part of the web browser, or the loader module is part of the application frameworks and a loader of a most recent application framework is used as the loader module for each of the plurality of application frameworks.

* * * * *